E. POULIN & H. BARIL.
CURD BREAKING APPARATUS.
APPLICATION FILED OCT. 25, 1909.
964,935.
Patented July 19, 1910.
2 SHEETS—SHEET 1.
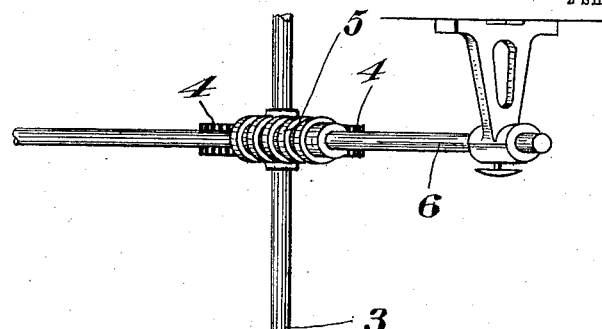
Fig. 1
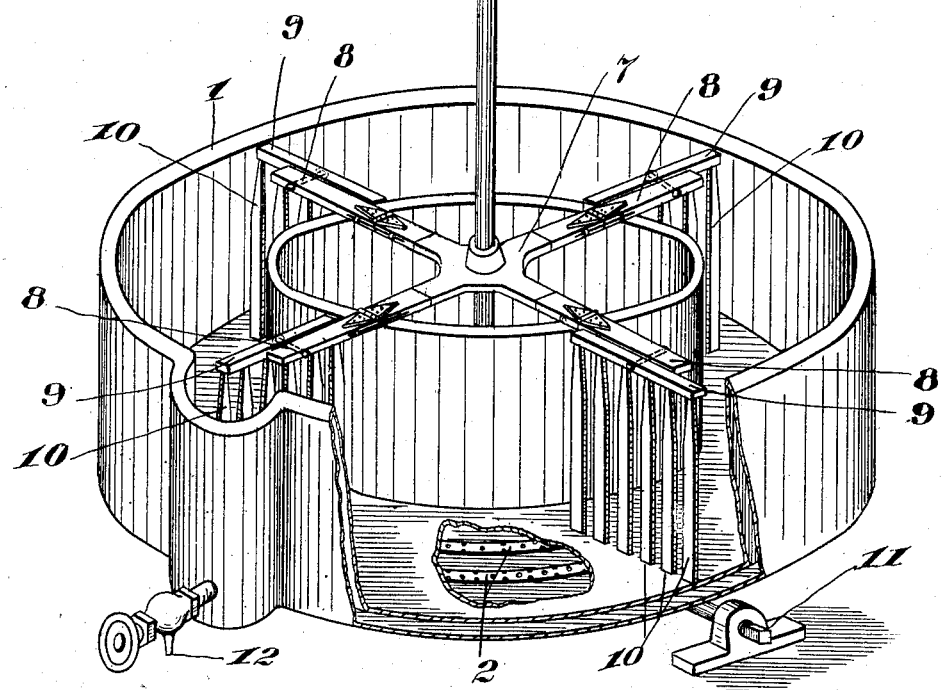
Witnesses:
ELZEAR POULIN &
HENRI BARIL
Inventors
By
Attorneys E. POULIN & H. BARIL.
CURD BREAKING APPARATUS.
APPLICATION FILED OCT. 25, 1909.
964,935.
Patented July 19, 1910.
2 SHEETS—SHEET 2.
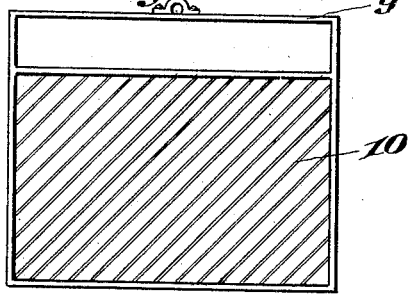
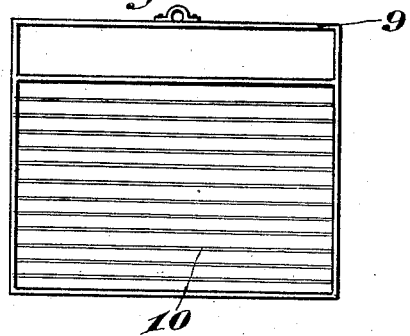
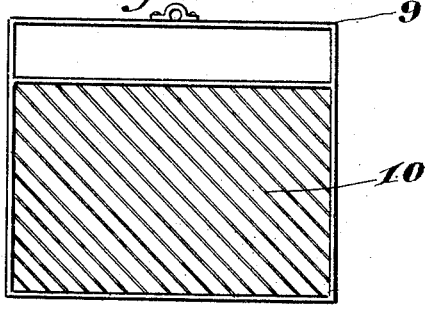
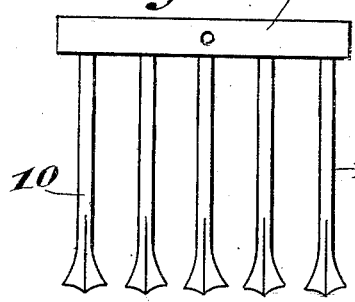
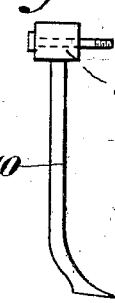
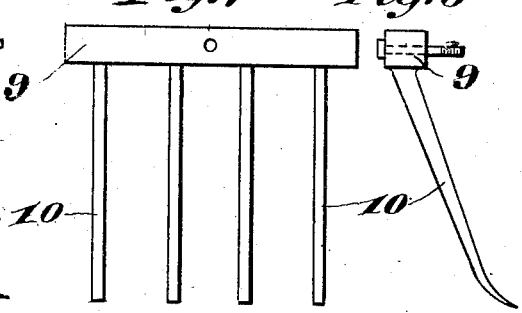
Witnesses:
L. A. Gauvin
E. J. Gauvin
ELZEAR POULIN &
HENRI BARIL
Inventors
By Marion & Marion
Attorneys

UNITED STATES PATENT OFFICE.

ELZEAR POULIN AND HENRI BARIL, OF LA PATRIE, QUEBEC, CANADA.

CURD-BREAKING APPARATUS.

964,935. Specification of Letters Patent. Patented July 19, 1910.

Application filed October 25, 1909. Serial No. 524,341.

*To all whom it may concern:*

Be it known that we, ELZEAR POULIN and HENRI BARIL, subjects of the King of Great Britain, residing at La Patrie, county of Compton, in the Province of Quebec, Canada, have invented certain new and useful Improvements in Curd - Breaking Apparatus; and we do hereby declare that the following is a full, clear, and exact description of the invention, such as will enable others skilled in the art to which it appertains to make and use the same.

The invention to be hereinafter described relates to dairy machinery, and particularly to curd breaking machines for cheese presses.

Broadly speaking, it comprises an annular jacketed vat, a plurality of frames pivotally mounted above said vat and each provided with a series of stirring blades projecting downwardly into the tank, means for rotating the frames, and means for tilting the tank so that the separated whey may flow to the lower side of the same and be drained off.

In order to more clearly disclose the construction, operation and use of the invention, reference should be had to the accompanying drawings forming part of the present application.

Throughout the several figures of the drawings, like reference characters designate the same parts.

In the drawings: Figure 1 is a perspective view of the invention complete, partly broken away; Figs. 2, 3 and 4 are front views of several well known forms of curd cutters, which may be used, if desired; Fig. 5 is a front view of a preferred form of curd breaker; Fig. 6 is an end view of Fig. 5; Fig. 7 is a front view of a second preferred form of curd breaker; and, Fig. 8 is an end view of Fig. 7.

The main object of the invention is to provide a curd breaker of simple and economical construction, in which the curds will be broken and the whey separated in the shortest possible time and with the least amount of work.

In the preferred form of the invention, an annular double-walled or jacketed tank 1 is provided. A heating coil 2 is mounted in the bottom of the tank between the two lower walls and is perforated throughout its length to allow steam to issue therethrough and fill the space between the double walls of the tank and heat the same.

Extending centrally into or through the tank 1, is a drive shaft 3, which is provided with a worm wheel 4 adapted to mesh with and be driven by a worm 5 on a power shaft 6. Adjacent the lower end of the shaft 3, is secured a spider 7, to the arms of which are hinged, to swing vertically, bars or slats 8, to each of which is pivotally connected a curd cutter head or frame 9, provided with a plurality of cutting or breaking blades 10. These blades may be either straight plain slats, as in Fig. 1, or they may have straight shanks provided with forwardly inclined points, as in Figs. 5 and 6, or, again, they may have forwardly inclined shanks ending in gradually curved and tapered points.

If desired, an old and well known form of curd cutting frame, such as shown in Figs. 2, 3 and 4, may be pivoted to the arms 8 in place of the heads or frames 9. The forms shown in Figs 5, 6, 7 and 8, however, are preferred, as it is found that they cut the curds much more readily and quickly and with greater ease and less effort than the old forms.

When the curds have been thoroughly cut or broken, it is desired, of course, to drain the whey from the tank. To facilitate the draining, a shaft 11 has been secured to the bottom of the tank, extending diametrically across the same. This shaft is mounted in bearing blocks at opposite sides of the tank, and has one end squared to receive a hand crank or like device, whereby it may be partially rotated. Partial rotation of the shaft in one direction will tilt the tank so that the drain cock 12 will be at the lowest part of the tank. In such position, the whey will all flow toward the drain cock, and may be drawn from the tank.

It is clear that changes may be made in the construction, arrangement and disposition of the several parts of the invention, and it is meant to include all such within this application, wherein only a preferred form has been disclosed.

Having thus fully described our invention, what we claim as new and desire to secure by Letters Patent, is:—

1. An apparatus of the character described, comprising an annular double walled tank, means disposed within the walls of said tank for heating the same, a spider revolubly mounted above said annular tank, slats connected to said spider, and breaking blades connected to said slats.

2. An apparatus of the character described, comprising an annular tank, a spider revolubly mounted above said tank, slats connected to said spider, breaking blades connected to said slats, and means for tilting said tank.

3. An apparatus of the character described, comprising an annular tank, a spider revolubly mounted above said tank, slats connected to said spider, curd cutter heads connected to said slats, and breaking blades connected to said heads.

4. An apparatus of the character described, comprising an annular tank, a spider revolubly mounted above said tank, slats connected to said spider, curd cutter heads pivotally connected to said slats, and curd breaking blades connected to said heads.

5. An apparatus of the character described, comprising an annular tank, a spider revolubly mounted above said tank, slats hinged to said spider to swing vertically, curd cutter heads pivotally connected to said slats and adapted to oscillate laterally of said tank, and curd breaking blades connected to said heads.

In witness whereof we have hereunto set our hands in the presence of two witnesses.

ELZEAR POULIN.
HENRI BARIL.

Witnesses:
J. R. TARTRE,
J. F. RAOUL TARTRE.